United States Patent [19]
McCorvey

[11] Patent Number: 5,121,602
[45] Date of Patent: Jun. 16, 1992

[54] POLLUTION CONTROL APPARATUS

[76] Inventor: Allan F. McCorvey, 10702 Munn St., Houston, Tex. 77029

[21] Appl. No.: 633,674

[22] Filed: Dec. 26, 1990

[51] Int. Cl.$^5$ ............................................. F01N 03/04
[52] U.S. Cl. ...................................... 60/310; 55/231; 60/309; 60/902; 261/84
[58] Field of Search .................. 60/310, 902, 309; 261/3, 84, 90; 55/DIG. 30, 257.1, 223, 231

[56] References Cited

U.S. PATENT DOCUMENTS

| | | | |
|---|---|---|---|
| 3,282,047 | 11/1966 | Wertheimer | 60/310 |
| 3,353,336 | 11/1967 | Caballero | 60/310 |
| 3,630,030 | 12/1971 | Wagner | 60/310 |
| 3,763,634 | 10/1973 | Alliger | 55/223 |
| 3,768,981 | 10/1973 | Alliger | 60/310 |
| 3,817,222 | 6/1974 | Staib | 60/310 |
| 3,967,445 | 7/1976 | Manfredi | 60/279 |
| 3,979,909 | 9/1976 | Staggs | 60/310 |
| 4,301,652 | 11/1981 | Sohda et al. | 60/310 |
| 4,578,091 | 3/1986 | Borja | 60/310 |
| 4,821,513 | 4/1989 | Pickering | 60/310 |

FOREIGN PATENT DOCUMENTS 1459584 12/1965 France ..................... 60/310

Primary Examiner—Ira S. Lazarus
Assistant Examiner—L. Heyman
Attorney, Agent, or Firm—Neal J. Mosely

[57] ABSTRACT

A pollution control apparatus is shown for use on automobiles and trucks. This pollution control apparatus fits on the automotive exhaust pipe. A collector unit is secured between the exhaust pipe and tail pipe. The collector unit has a pair of blowers or bladed rotors which are impinged by a mixture of exhaust gases and water which causes the water droplets and dissolved and entrained materials to separate and drain through outlet drains. Water is injected into a U-shaped trap between exhaust pipe and the collector unit. Water from the bottom of the collector unit is pumped by a pump to a reservoir and entrained material is separated by a filter. Water from the filter drains by gravity through a radiator coil and thence to the reservoir from which it flows through vacuum valve to a U-shaped fitting. The water is injected into the exhaust gas stream to wash out entrained and soluble material. The mixture flows through blowers which cause the entrained and water-dissolved material to separate as described.

14 Claims, 1 Drawing Sheet

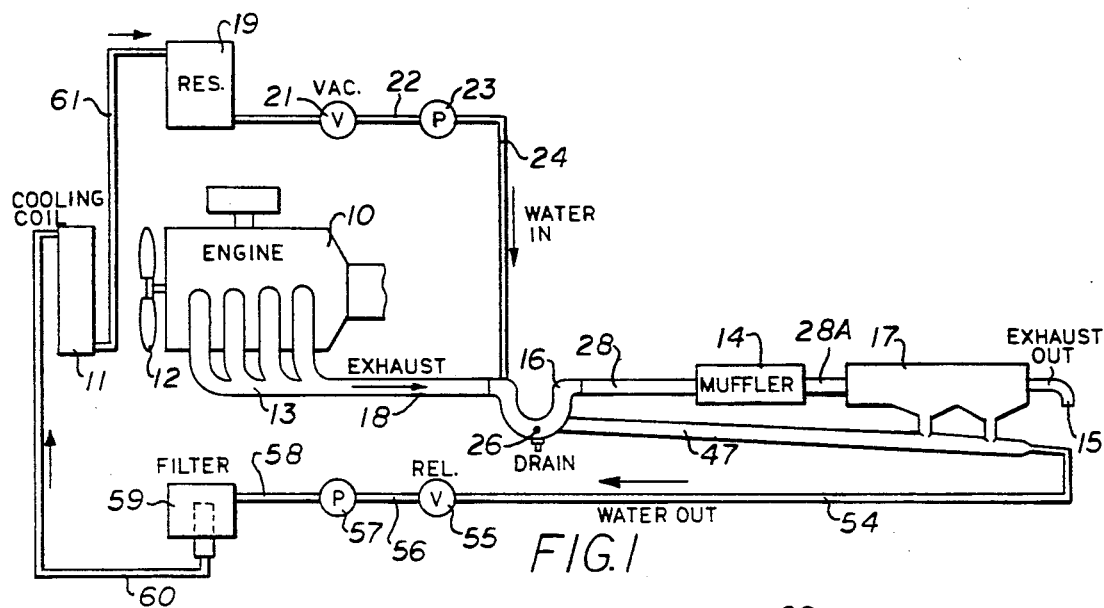
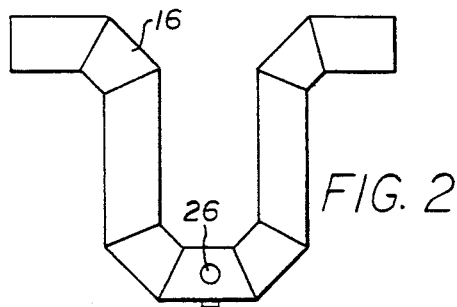
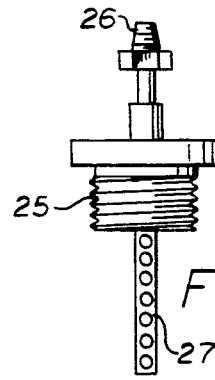
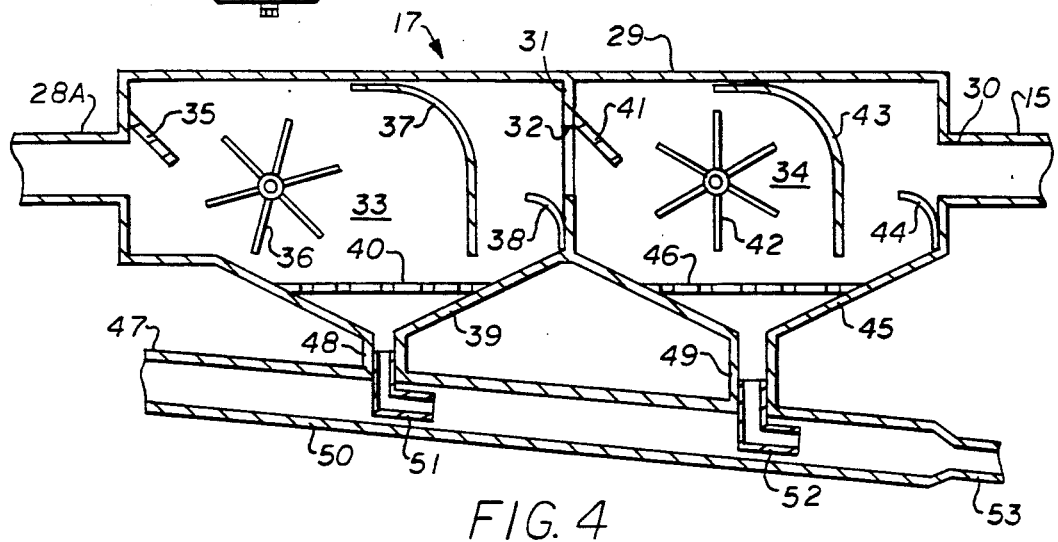

_5,121,602_

POLLUTION CONTROL APPARATUS

BACKGROUND OF THE INVENTION

1. Field Of The Invention

This invention relates generally to pollution control apparatus and more particularly to pollution control apparatus for motor vehicles.

2. Brief Description Of The Prior Art

Devices are known for scrubbing pollutants from air in industrial environments and some pollution control devices have been installed on motor vehicles.

There are several patents which disclose various types of automotive gas scrubbers.

Caballero U.S. Pat. No. 3,353,336 shows a three stage scrubber in line with an automotive exhaust. The scrubber scrubs out pollutants in three separate chambers and the scrubbing water is recovered and recycled.

Wertheimer U.S. Pat. No. 3,282,047 shows a scrubber with baffles which is located between the engine and the muffler and has a collection reservoir for recycling the scrubbing water.

Alliger U.S. Pat. No. 3,768,981 shows an auto exhaust scrubber with catalyst The scrubber passes auto exhaust through a cylindrical screen into a body of liquid and thence on to the exhaust.

Manfredi U.S. Pat. No. 3,967,445 shows an exhaust scrubber with a rotary finned heat exchanger and an after-burner.

Pickering U.S. Pat. No. 4,821,513 shows an automobile exhaust gas cleaner with multiple baffles.

The present invention is distinguished over the prior art in general, and these patents in particular by a pollution control apparatus shown for use on automobiles and trucks. This pollution control apparatus fits on the automotive exhaust pipe. A collector unit is secured between the exhaust pipe and tail pipe. The collector unit has a pair of blowers or bladed rotors which are impinged by a mixture of exhaust gases and water which causes the water droplets and dissolved and entrained materials to separate and drain through outlet drains. Water is injected into a U-shaped trap between exhaust pipe and the collector unit. Water from the bottom of the collector unit is pumped by a pump to a reservoir and entrained material is separated by a filter. Water from the reservoir drains by gravity through a radiator coil and thence to the reservoir from which it flows through vacuum valve to a U-shaped fitting. The water is injected into the exhaust gas stream to wash out entrained and soluble material. The mixture flows through blowers which cause the entrained and water-dissolved material to separate as described.

SUMMARY OF THE INVENTION

It is therefore an object of the present invention to provide a new and improved pollution control apparatus for motor vehicles.

It is another object of this invention is to provide a new and improved pollution control apparatus for motor vehicles which is simple to manufacture and efficient in reducing pollution.

Another object of this invention is to provide a new and improved pollution control apparatus for motor vehicles which is easily installed either at the factory or by the purchaser and user of the vehicle.

Another object of this invention is to provide a new and improved pollution control apparatus for motor vehicles which substantially reduces particulate pollutants and noxious gases.

Still another object of this invention is to provide a new and improved pollution control apparatus for motor vehicles which is fitted on the exhaust system.

Still another object of this invention is to provide a new and improved pollution control apparatus for motor vehicles which is fitted on the exhaust system secured between the exhaust pipe and tail pipe.

A further object of this invention is to provide an improved pollution control apparatus for motor vehicles which has a collector unit secured between the exhaust pipe and tail pipe with a pair of blowers or bladed rotors which are impinged by a mixture of exhaust gases and water which causes the water droplets and dissolved and entrained materials to separate and drain through outlet drains.

A further object of this invention is to provide an improved pollution control apparatus for motor vehicles in which water is injected into the exhaust gas stream to wash out entrained and soluble material and which has a collector unit secured between the exhaust pipe and tail pipe with a pair of blowers or bladed rotors which are impinged by a mixture of exhaust gases and water which causes the water droplets and dissolved and entrained materials to separate and drain through outlet drains.

Other objects of the invention will become apparent from time to time throughout the specification and claims as hereinafter related.

The above noted objects and other objects of the invention are accomplished by a novel pollution control apparatus for use on automobiles and trucks which fits on the automotive exhaust pipe. A collector unit is secured between the exhaust pipe and tail pipe. The collector unit has a pair of blowers or bladed rotors which are impinged by a mixture of exhaust gases and water which causes the water droplets and dissolved and entrained materials to separate and drain through outlet drains. Water is injected into a U-shaped trap between exhaust pipe and the collector unit. Water from the bottom of the collector unit is pumped by a pump to a reservoir where entrained material is separated by a filter. Water from the filter drains by gravity through a radiator coil and thence to the reservoir from which it flows through vacuum valve to a U-shaped fitting The water is injected into the exhaust gas stream to wash out entrained and soluble material. The mixture flows through blowers which cause the entrained and water-dissolved material to separate as described.

BRIEF DESCRIPTION OF THE DRAWINGS

FIG. 1 is a schematic diagram showing a pollution control apparatus for motor vehicles demonstrating a preferred embodiment of this invention.

FIG. 2 is a detail view, in elevation, of the U-trap where water is injected into the automotive exhaust stream in the pollution control apparatus of FIG. 1.

FIG. 3 is a detail view, in elevation, of the water injector used in the U-trap shown in FIG. 2.

FIG. 4 is a sectional view of the separator chamber and air-contaminant separatory rotors for the apparatus shown in FIG. 1.

DESCRIPTION OF THE PREFERRED EMBODIMENT

Referring to the drawings by numerals of reference, and more particularly to FIGS. 1-4, there is shown schematically an automobile engine with muffler and exhaust and a novel pollution control apparatus installed thereon.

In FIG. 1, there is shown an engine 10 with cooling coil 11 and fan 12 Cooling coil 11 may be the automobile radiator or may be a separate coil to keep the water used in the pollution control apparatus separate from the cooling water for the engine. Engine 10 has an exhaust manifold 13 connected to a muffler 14 and tail pipe 15 for conventional exhausting of gases from the engine. The engine exhaust gases comprise a mixture of carbon dioxide and water vapor, particulate matter, such as carbon particles, and partial oxidation products of the engine fuel, including aldehydes, ketones, carboxylic acids, etc. In many places pollution control equipment is required for motor vehicles to remove completely or substantially reduce the particulate matter and partial oxidation products in the exhaust gases.

A pollution control system is connected in the exhaust system and comprises a U-trap 16 and collector 17 connected in the gas flow between exhaust line 28A from muffler 14 and tail pipe 15. Details of U-trap 16 and collector 17 will be described more fully below.

Water for use in U-trap 16 and collector 17 is circulated through a circulatory system comprising a water reservoir 19 connected by conduit 20 to vacuum valve 21 connected by conduit 22 to pump 23. Conduit 24 connects pump 23 to U-trap 16. A plug member 25 in U-trap 16 has and inlet fitting 26 and a perforated spray tube 27 for spraying water into the exhaust gas stream.

The exhaust gases and entrained water droplets pass from U-trap 16 to the inlet 28 to muffler 14 and thence by conduit 28A to collector 17. Collector 17 comprises a housing 29 having an inlet 28A and an outlet 30. Housing 29 has an internal wall 31 with an opening 32 dividing the collector into two chambers 33 and 34. At the top of chamber 33 adjacent to inlet 28A, there is a baffle 35 adjacent to a bladed rotor 36 and baffle plates 37 and 38.

At the bottom of chamber 33, there is an inclined bottom wall 39 and perforated plate 40. At the top of chamber 34 adjacent to opening 32, there is a baffle 41 adjacent to a bladed rotor 42 and baffle plates 43 and 44. At the bottom of chamber 34, there is an inclined bottom wall 45 and perforated plate 46. A bottom outlet 48 in inclined wall 39, and a bottom outlet 49 in inclined wall 45 are connected into an inclined drain tube 50 having a conduit 47 connecting to the bottom of U-trap 16. Venturi tubes 51 and 52 are positioned in bottom outlets 48 and 49 to assist in drawing water and entrained pollutants through the drain tube 50 from the bottom of U-trap 16 and from the bottom of collector 17.

The outlet 53 from drain tube 50 is connected by conduit 54 to relief valve 55 Conduit 56 connects relief valve 55 to pump 57 which is connected by conduit 58 to filter 59. Conduit 60 connects filter 59 to cooling coil 11 which is in turn connected by conduit 61 to reservoir 19 to complete the loop of water circulation.

OPERATION

While the operation of this invention should be obvious from the foregoing description, it will be restated for clarity.

From the above description, it is seen that this apparatus fits in the automotive exhaust system and scrub pollutants from the exhaust in a more efficient manner. Water is circulated in a continuous loop from reservoir 19 by pump 23 (opened in response to engine suction when engine is started) and sprayed through the perforated spray tube 27 into the exhaust gas stream in U-trap 16 to produce a mist of exhaust gas and water droplets.

This mixture of exhaust gas and water droplets enters the inlet 28 to muffler 14 and thence into collector housing 29 where it part it impinges against bladed rotor 36, directed downward by baffle 3B, causing it to turn and throw water droplets against baffle 37 from which the water drains through perforated plate 40, flows down walls 39 and exits through outlet 48.

Part of the mixture of exhaust gas and water droplets passes from chamber 33 past baffle 38 and through opening 32 into chamber 34 where it is directed downward by baffle 41 and impinges against bladed rotor 42 causing it to turn and throw water droplets against baffle 43 from which the water drains through perforated plate 46, flows down walls 45 and exits through outlet 49. The exhaust gas then passes baffle 44 and exits through outlet 30 to muffler 14 and tail pipe 15 as purified exhaust gas. Tests run on pollution control test equipment showed a very substantial reduction in pollutants and no water droplets discharging from tail pipe 15.

The water used in U-trap 16 and collector 17 is supplied from reservoir 19 by pump controlled by vacuum valve 21 (opened in response to engine suction when engine is started). The water exiting from the bottom of collector 17 passes through outlet tube 50 where the venturi tubes maintain a suction tending to draw water and a small amount of gas through outlets 47, 48 and 49. The water from collector outlet tube 50 is drawn by pump 57 (connected to be energized when the engine ignition system is on) through relief valve 55 where gas is vented and the remaining water is circulated through filter 59 to cooling coil 11 and back to the reservoir While this invention has been shown fully and completely with special emphasis on certain preferred embodiments, it should be understood that within the scope of the appended claims the invention may be practiced otherwise than as specifically described herein.

I claim:

1. A pollution control apparatus for a motor vehicle having an engine discharging exhaust gases into a muffler and out through a tail pipe, said apparatus comprising means to spray water into said exhaust gases into produce a mist of water droplets containing dissolved and entrained pollutants in said exhaust gases and connected to said muffler, means to separate said water droplets from said exhaust gas mist and pass cleaned exhaust gases from said muffler and out through said tail pipe, said water droplet separating means comprising a housing having a wall with an opening therein dividing the housing into plurality of chambers, means in each of said chambers for separating said water droplets from said mist, means to separate entrained gases from said separated water droplets and pass on a stream of water, said separating means comprising a bladed rotor in each chamber positioned to be impinged and rotated by flow of said mist to coalesce and separate water droplets by centrifugal action, baffles in said chambers to be impinged by said droplets to flow to the bottom of said chambers, an outlet from said housing connected to discharge cleaned gases to said tail pipe, and outlets in the bottom of said chambers to discharge collected water therefrom, means to separate particulate matter from said stream of water, and means to circulate said stream of water, free of particulate matter, to said spray means.

2. A pollution control apparatus according to claim 1 in which said spray means is connected between said engine and said muffler and said water droplet separating means is connected between said muffler and said tail pipe.

3. A pollution control apparatus according to claim 1 in which said spray means comprises a U-trap and a spray tube therein positioned in the flow of exhaust gases.

4. A pollution control apparatus according to claim 1 including venturi means in series with said bottom outlets to assist in withdrawal of water from said chambers.

5. A pollution control apparatus according to claim 4 in which said bottom outlets include an inclined discharge tube in which said venturi means are positioned.

6. A pollution control apparatus according to claim 1 in which said means to separate entrained gases from said separated water droplets and pass on a stream of water includes a pressure relief valve.

7. A pollution control apparatus according to claim 1 in which said means to separate particulate matter from said stream of water includes a filter.

8. A pollution control apparatus according to claim 1 in which said spray means comprises a U-trap and a spray tube therein positioned in the flow of exhaust gases, said U-trap is connected between said engine and said muffler and said housing is connected between said muffler and said tail pipe.

9. A pollution control apparatus according to claim 8 in which said bottom outlets include an inclined discharge tube with venturi means therein assisting in discharge of water from said collector and from the bottom of said U-trap.

10. A pollution control apparatus according to claim 8 in which said means to separate entrained gases from said separated water droplets and pass on a stream of water includes a pressure relief valve.

11. A pollution control apparatus according to claim 8 in which said means to separate particulate matter from said stream of water includes a filter.

12. A pollution control apparatus according to claim 9 in which said bottom outlets include an inclined discharge tube in which said venturi means are positioned, said means to separate entrained gases from said separated water droplets and pass on a stream of water comprises a pressure relief valve, and said means to separate particulate matter from said stream of water comprises a filter.

13. A pollution control apparatus according to claim 1 including a reservoir positioned to hold water to be fed to said water spray means, and means for cooling water returned from said particulate separating means.

14. A pollution control apparatus according to claim 8 a reservoir positioned to hold water to be fed to said water spray means, and means for cooling water returned from said particulate separating means.

* * * * *